United States Patent
Yamazaki et al.

(10) Patent No.: US 7,436,425 B2
(45) Date of Patent: Oct. 14, 2008

(54) OPTICAL WRITING APPARATUS AND IMAGE FORMING APPARATUS

(75) Inventors: Kozo Yamazaki, Hyogo (JP); Noboru Kusunose, Kanagawa (JP); Iwao Matsumae, Tokyo (JP); Kazunori Bannai, Tokyo (JP); Kohta Takenaka, Tokyo (JP); Yoshinobu Sakaue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 287 days.

(21) Appl. No.: 11/226,268

(22) Filed: Sep. 15, 2005

(65) Prior Publication Data
US 2006/0055769 A1 Mar. 16, 2006

(30) Foreign Application Priority Data
Sep. 16, 2004 (JP) ............................. 2004-269314

(51) Int. Cl.
B41J 15/14 (2006.01)
B41J 27/00 (2006.01)
(52) U.S. Cl. ...................................... 347/244; 347/258
(58) Field of Classification Search ......... 347/234–235, 347/241, 244–245, 248–250, 256–258; 250/235, 250/239; 352/198; 359/210, 204, 216
See application file for complete search history.

(56) References Cited

U.S. PATENT DOCUMENTS

| | | | | | |
|---|---|---|---|---|---|
| 4,121,251 | A | * | 10/1978 | Arai | 348/500 |
| 4,720,632 | A | * | 1/1988 | Kaneko | 250/235 |
| 4,916,485 | A | * | 4/1990 | Loth et al. | 352/198 |
| 4,918,306 | A | * | 4/1990 | Saito | 250/235 |
| 5,247,386 | A | * | 9/1993 | Saito | 359/216 |
| 5,606,449 | A | * | 2/1997 | Nishiyama | 359/210 |
| 5,737,007 | A | * | 4/1998 | Kashima et al. | 347/250 |
| 6,366,385 | B2 | * | 4/2002 | Kimura | 359/204 |
| 6,697,092 | B2 | | 2/2004 | Bannai | |
| 6,891,559 | B1 | | 5/2005 | Bannai | |
| 6,969,846 | B2 | * | 11/2005 | Tanaka et al. | 250/239 |
| 2002/0101494 | A1 | | 8/2002 | Ono | |
| 2003/0001944 | A1 | * | 1/2003 | Yoshida et al. | 347/241 |

(Continued)

FOREIGN PATENT DOCUMENTS

EP    1 424 609 A2    6/2004

(Continued)

OTHER PUBLICATIONS

U.S. Appl. No. 11/672,798, filed Feb. 8, 2007, Kusunose, et al.

*Primary Examiner*—Hai C Pham
(74) *Attorney, Agent, or Firm*—Oblon, Spivak, McClelland, Maier & Neustadt, P.C.

(57) ABSTRACT

An optical writing apparatus includes a deflecting part having a deflection plane for deflecting a plurality of light beams, a synchronization detection mirror for reflecting the plurality of light beams from the deflecting part, a synchronization detection part for detecting the timing for deflecting the plural light beams reflected from the synchronization detection mirror, and a housing for housing the deflecting part and the synchronization detection part. The synchronization detection part includes a lens for converging the plural light beams reflected from the synchronization detection mirrors, a light detection plate for detecting the plural light beams converged by the lens, and a holding member for holding the lens and the light detection plate.

9 Claims, 7 Drawing Sheets

U.S. PATENT DOCUMENTS

| | | |
|---|---|---|
| 2004/0090656 A1 | 5/2004 | Yoshida |
| 2004/0100550 A1 | 5/2004 | Bannai et al. |
| 2005/0174418 A1 | 8/2005 | Sakaue et al. |
| 2006/0055769 A1 | 3/2006 | Yamazaki et al. |

FOREIGN PATENT DOCUMENTS

| | | | | |
|---|---|---|---|---|
| JP | 10048556 A | * | 2/1998 | |
| JP | 2000255096 A | * | 9/2000 | |
| JP | 10-148777 | | 10/2000 | |
| JP | 2002-196269 | | 7/2002 | |
| JP | 2002-350753 | | 12/2002 | |
| JP | 2002350753 A | * | 12/2002 | |

* cited by examiner

OPTICAL WRITING APPARATUS AND IMAGE FORMING APPARATUS

BACKGROUND OF THE INVENTION

1. Field of the Invention

The present invention relates to an optical writing apparatus and an image forming apparatus.

2. Description of the Related Art

Among various types of image forming apparatuses including a printer, a copier, a facsimile machine, and a multi-functional apparatus having multiple functions, there is, for example, a tandem type color image forming apparatus. Multi-colored images are formed with this image forming apparatus, for example, by recording latent images onto an arrangement of four image carriers (e.g. photoconductor drums) by irradiating light beams from multiple light sources thereto, developing (and making visible) the latent images on the image carriers by using developers of different colors (e.g. toners of yellow, magenta, cyan, and black), successively conveying transfer materials (e.g. recording paper) on a transfer conveyor belt to transfer portions corresponding to respective latent images, superposing and transferring the developed visible images to the transfer materials, and fixing the transferred images onto the transferred materials.

One example of an optical writing apparatus used for the tandem type color image forming apparatus is shown in Japanese Laid-Open Patent Application No. 2002-196269. This optical writing apparatus includes multiple light sources, a light deflecting part for deflecting the multiple light beams from the multiple light sources to two opposite directions, and optical systems symmetrically disposed in two directions with the light deflecting part situated at the center for forming images by scanning the multiple light beams (deflected by the light deflecting part) to a target scanning plane, in which the multiple light sources, the light deflecting part and the optical systems are installed in a single housing.

Another example of an optical writing apparatus used for the tandem type color image forming apparatus is shown in Japanese Laid-Open Patent Application No. 10-148777. This optical writing apparatus deflects multiple light beams irradiated from multiple light sources by using a light deflecting part having deflecting planes. This optical writing apparatus includes multiple imaging parts corresponding to the multiple light beams for imaging onto a photoconductor(s). The multiple imaging parts is integrally formed with light forming elements (fθ lenses) that are overlappingly layered in a sub-scanning direction. Furthermore, the image forming elements are provided with reflection planes with a converging property (converging function). The optical writing apparatus allows multiple light beams to be incident on a synchronization detection part for obtaining synchronicity.

Nevertheless, with the technology shown in Japanese Laid-Open Patent Application No. 10-148777, in order to guide multiple light beams to the same synchronization detection part, the reflections planes that are to be mounted on the imaging elements (fθ lenses) require a converging property (converging function). This, however, causes the configuration of the image forming element to be complicated.

SUMMARY OF THE INVENTION

It is a general object of the present invention to provide an optical writing apparatus and an image forming apparatus that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an optical writing apparatus and an image forming apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an optical writing apparatus including: a deflecting part having a deflection plane for deflecting a plurality of light beams; a synchronization detection mirror for reflecting the plurality of light beams from the deflecting part; a synchronization detection part for detecting the timing for deflecting the plural light beams reflected from the synchronization detection mirror, the synchronization detection part including a lens for converging the plural light beams reflected from the synchronization detection mirrors, a light detection plate for detecting the plural light beams converged by the lens, and a holding member for holding the lens and the light detection plate; and a housing for housing the deflecting part and the synchronization detection part.

In the optical writing apparatus according to an embodiment of the present invention, wherein the synchronization detection mirror may be attached to the housing in an inclined state, wherein the lens may be held by the holding member in an inclined state, wherein the angle of the inclination of the lens may be substantially two times the angle of the inclination of the synchronization detection mirror.

In the optical writing apparatus according to an embodiment of the present invention, the holding member may have a tapped hole provided between the lens and the light detection plate for attachment to the housing.

In the optical writing apparatus according to an embodiment of the present invention, the holding member may have locating holes provided on both sides of the tapped hole.

In the optical writing apparatus according to an embodiment of the present invention, the holding member may be formed of a resin material.

Furthermore, the present invention provides an image forming apparatus including an image carrier; and the optical writing apparatus according to an embodiment of the present invention for writing an image onto the image carrier.

In the image forming apparatus according to an embodiment of the present invention, the distance between the synchronization detection part and the deflection plane of the deflecting part may be substantially 10% to 16% less than the distance between the deflection plane of the deflecting part and the image carrier.

In the image forming apparatus according to an embodiment of the present invention, the lens may have an incident side being a cylindrical surface and an outgoing side being a spherical surface.

In the image forming apparatus according to an embodiment of the present invention, the lens may have an incident side being a spherical surface and an outgoing side being a cylindrical surface.

Other objects and further features of the present invention will be apparent from the following detailed description when read in conjunction with the accompanying drawings.

DESCRIPTION OF THE PREFERRED EMBODIMENTS

Figure 1:
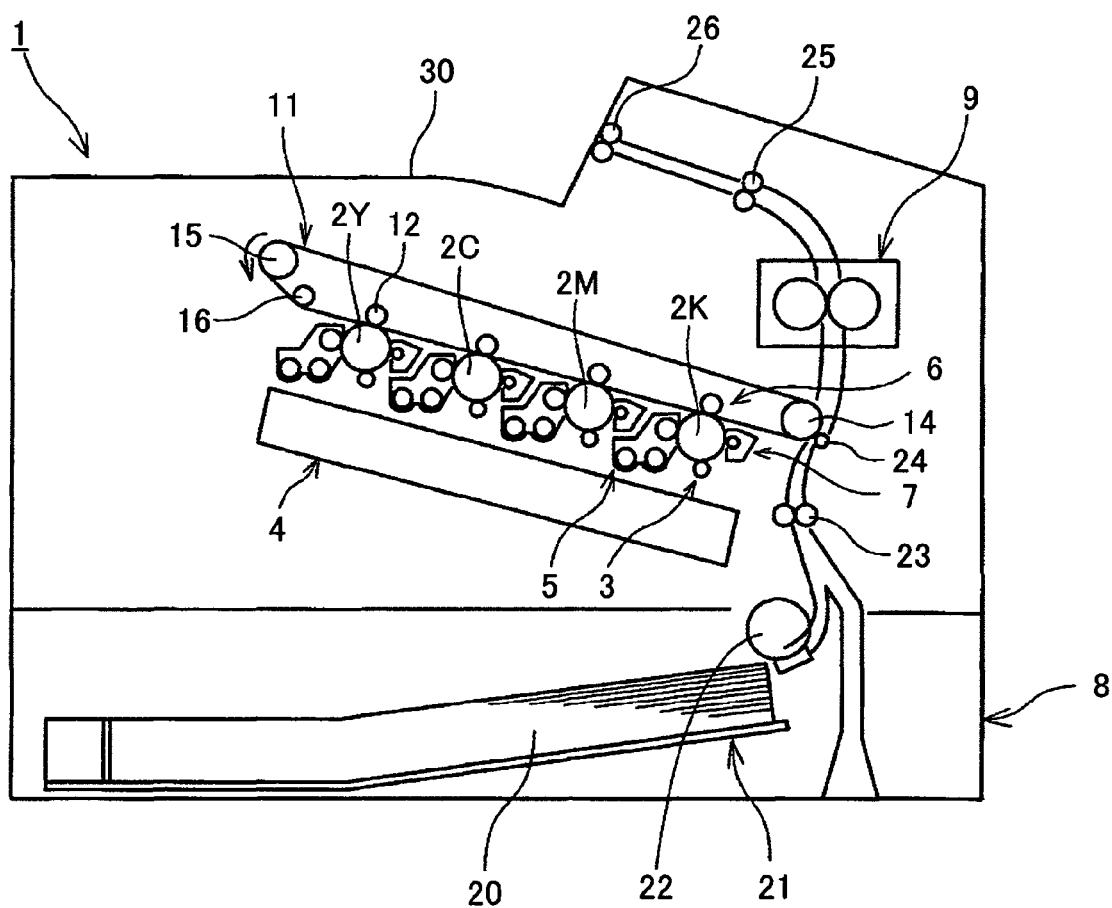
FIG. 1 is a schematic drawing showing an exemplary configuration of an image forming apparatus including an optical writing apparatus according to an embodiment of the present invention.

In the following, embodiments of the present invention will be described with reference to the accompanying drawings.

An image forming apparatus 1 according to an embodiment of the present invention is described with reference to FIG. 1.

The image forming apparatus 1 is an apparatus for forming images by employing an electrophotographic method. The image forming apparatus 1 includes multiple photoconductor drums 2Y, 2C, 2M, 2K (also collectively referred to as "photoconductor drum 2") which is as an image carrier, a charging unit(s) 3 for charging each of the photoconductor drums 2, an optical writing apparatus (optical writing unit) 4 which is an exposing part for writing a latent image to the photoconductor drum 2, a developing unit 5 for developing the latent image written on each photoconductor drum 2, a transferring unit 6 for transferring a toner image (obtained by developing the latent image with a toner) on the photoconductor drum 2 to an intermediary transfer member (intermediary transfer belt) 11, a cleaning unit 7 for removing residual toner and charge remaining on the photoconductor drum 2, a paper feeding apparatus 8 provided at a lower side of the image forming apparatus 1 for feeding paper, and a fixing apparatus 9 for fixing the transferred toner image onto a sheet of paper 20.

The image forming apparatus 1 according to the embodiment of the present invention forms four color images of yellow (Y), cyan (C), magenta (M), and black (K) beginning from the left side of FIG. 1 (beginning from an upstream side with respect to the rotating the intermediary transfer belt 11 as shown in FIG. 1) and superposes the four color images on the intermediary transfer belt 11, to thereby form a full color image. It is to be noted that a full color image may also be formed by using three colors of yellow (Y), cyan (C), and magenta (M). That is, a full color image may be formed without using black (K).

The charging unit(s) 3 is a conductive roller that is shaped as a roller. Electrostatic bias voltage is supplied from an electric source apparatus (not shown) to the charging unit 3. Then, the charging unit 3 uniformly charges the surface of the photoconductor drum 2 by contacting to the photoconductor drum 2. The optical writing apparatus 4 irradiates a laser beam to the surface of each photoconductor drum 2. By switching on and off the irradiation of the laser beam in accordance with image data, an electrostatic latent image corresponding to the image data is formed on the photoconductor drum 2. The developing unit 5 includes, for example, a developing roller (not shown) and a developer containing part (not shown). The developing unit 5 enables the latent image on the photoconductor drum 2 to become visible by applying toner thereto (i.e. obtains a toner image by applying toner to the latent image on the photoconductor drum).

The transfer unit 6 transfers the toner image on the photoconductor drum 2 to the intermediary transfer belt 11 by using a transfer roller 12 situated on the back side of the intermediary transfer belt 11. The intermediary transfer belt 11 hung across a driving roller 14, a driven roller 15, and a tension roller 16. The driving roller 14, being driven by a drive motor (not shown), rotates the intermediary transfer belt 11 in the direction indicated by the arrow shown in FIG. 1. The toner image formed on the photoconductor drum is transferred onto the intermediary transfer belt 11 by contacting the transfer roller 12 to the intermediary transfer belt 11 and applying a predetermined bias voltage to the transfer roller 12 (This transfer is referred to as "first transfer").

After the first transfer, the cleaning unit 7 removes residual developer and charge remaining on the photoconductor drum 2 for preparing for the next coming operation.

Meanwhile, the paper (transfer material) 20, which is contained in a sheet feeding cassette 21 included in the sheet feeding apparatus 8, is separated and fed one sheet at a time by a sheet feeding roller (pickup roller) 22. Then, the paper 20 fed from the sheet feeding roller 22 is conveyed to a resist roller 23. Then, the resist roller 23 conveys the paper 20 to a transfer roller 24 serving as a second transfer part. The transfer roller 24, contacting the intermediary transfer belt 11, transfers the superposed four color toner image of the intermediary transfer belt 11 to the paper 20 (This transfer is referred to as "first transfer").

Then, the paper 20 is conveyed to the fixing apparatus 9 for fixing the image onto the paper 20. The fixing apparatus 9 fixes the image onto the paper 20 by applying heat and pressure to the paper 20. After the image is fixed to the paper 20, the paper 20 is conveyed to a conveying roller 25 and further to a discharge roller 26. The discharge roller 26 discharges the paper 20 to a paper discharge tray 30 provided outside of the image forming apparatus 1.

The above-described image forming apparatus 1 according to the embodiment of the present invention employs a so-called intermediary transfer method in which an image is transferred to (second transfer) a transfer material after superposing and transferring respective color images from multiple photoconductor drums 2Y, 2C, 2M, and 2K to the intermediary transfer belt 11. Alternatively, a so-called direct transfer method may be employed, in which an image is superposing and directly transferring respective color images from multiple photoconductor drums 2Y, 2C, 2M, and 2K to a transfer material.

Figure 2:
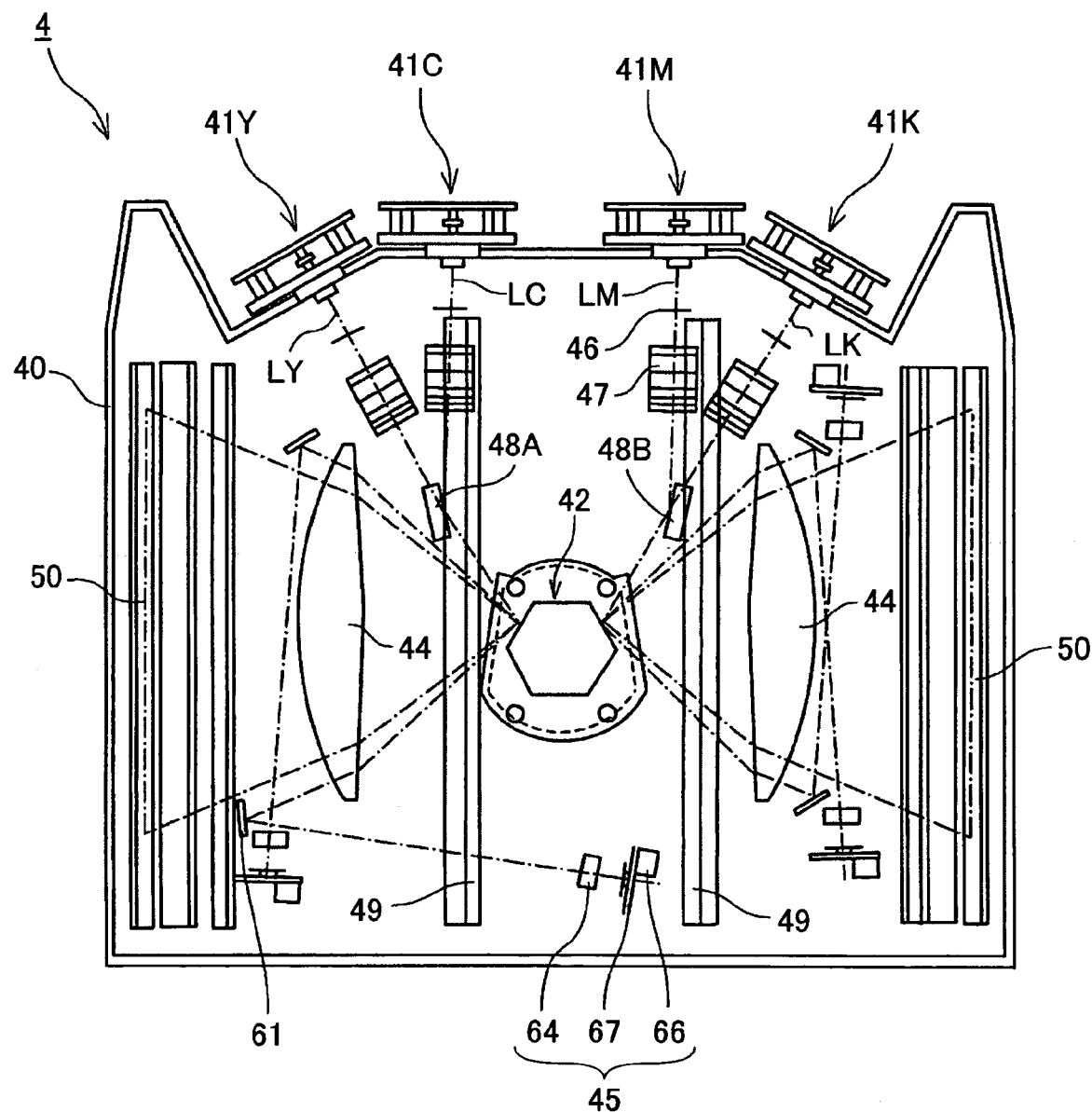
FIG. 2 is a plane view showing the internal configuration of an optical writing apparatus according to an embodiment of the present invention.

Next, the optical writing apparatus (exposing unit) 4 mounted on the image forming apparatus 1 according to the embodiment of the present invention is described with reference to FIGS. 2 and 3.

The optical writing apparatus 4 according to this embodiment of the present invention comprises a housing 40. The housing 40 includes, for example, four laser units 41Y, 41M, 41C, and 41K (also collectively referred to as "laser unit 41") for irradiating laser beams LY, LM, LC, and LK (also collectively referred to as "laser beam L") to corresponding photoconductor drums 2, a polygon mirror 42 (i.e. deflecting part (deflection scanning part)) including two polygon mirrors 42a, 42b for deflecting (and scanning) each of the laser beams L (LY, LM, LC, and LK) (which are modulated according to image signals) irradiated from the laser units 41Y, 41M, 41C, and 41K, an imaging element (i.e. imaging lens) 44 for imaging the deflected laser beams L to a desired size on the photoconductor drum 2, and a synchronization detection part 45 for detecting the timing of, for example, beginning the deflection (scanning) of the laser beam L.

The polygon mirror 42 is rotated at high speed by a polygon motor 43 (not shown). An aperture 46 and a cylinder lens 47 are disposed between the polygon mirror 42 and each laser unit 41. This optical writing apparatus 4 according to this embodiment of the present invention employs the so-called opposite scanning type method, in which two laser beams LY, LC from the laser units 41Y, 41C are incident on one side of the polygon mirror 42 (42a), and two laser beams LM, LK from the laser units 41M, 41K are incident on the other side of the polygon mirror (42b). Accordingly, in order to allow two laser beams LY, LC from the laser units 41Y, 41C to be incident on one side of the polygon mirror 42 (42a) and allow two laser beams LM, LK from the laser units 41M, 41K are incident on the other side of the polygon mirror (42b), a mirror 48A is disposed on one optical path and a mirror 48B is disposed on another optical path.

Sound proof glass 49 is provided on both sides of the polygon mirror 42 for reducing noise in a case where, for example, the rotation count of the polygon mirror 42 is high (e.g. greater than approximately 30,000 rpm).

Then, the laser beam L, being deflected (deflected and scanned) by the polygon mirror 42, is incident on the imaging lens 44 via the sound proof glass 49. Then, the laser beam L becomes incident on each photoconductor drum 2 via a mirror 50. In this case, the angle of incidence with respect to the surface of the photoconductor drum 2 is set so that the laser LY, LC, LM, and LK for each color may substantially have the same angle of incidence.

The housing 40 of the optical writing apparatus 4 has a lid member 51 with openings through the lasers L are emitted to the photoconductor drums 2. Each of the openings of the lid member 51 is provided with a dust proof glass 52 for preventing, for example, dust from entering the optical writing apparatus 4.

Figure 4:
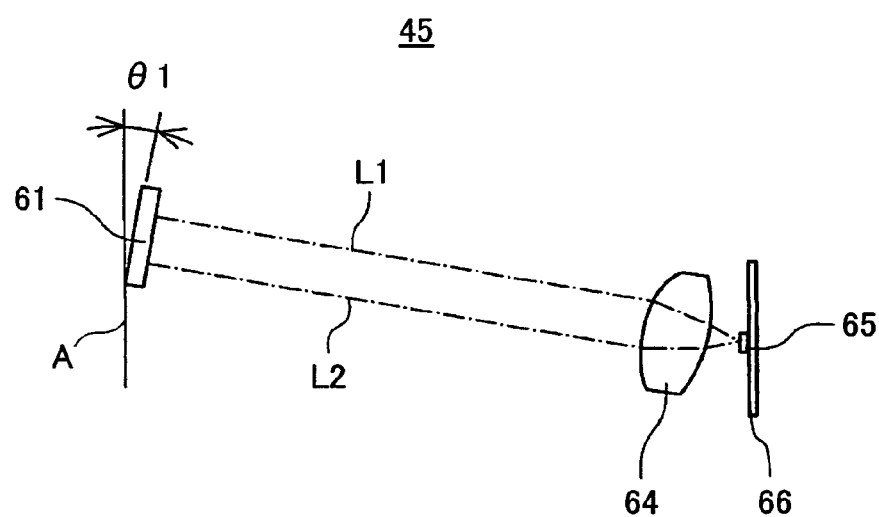
FIG. 4 is a schematic drawing for describing a synchronization detection part according to an embodiment of the present invention.
Figure 5:
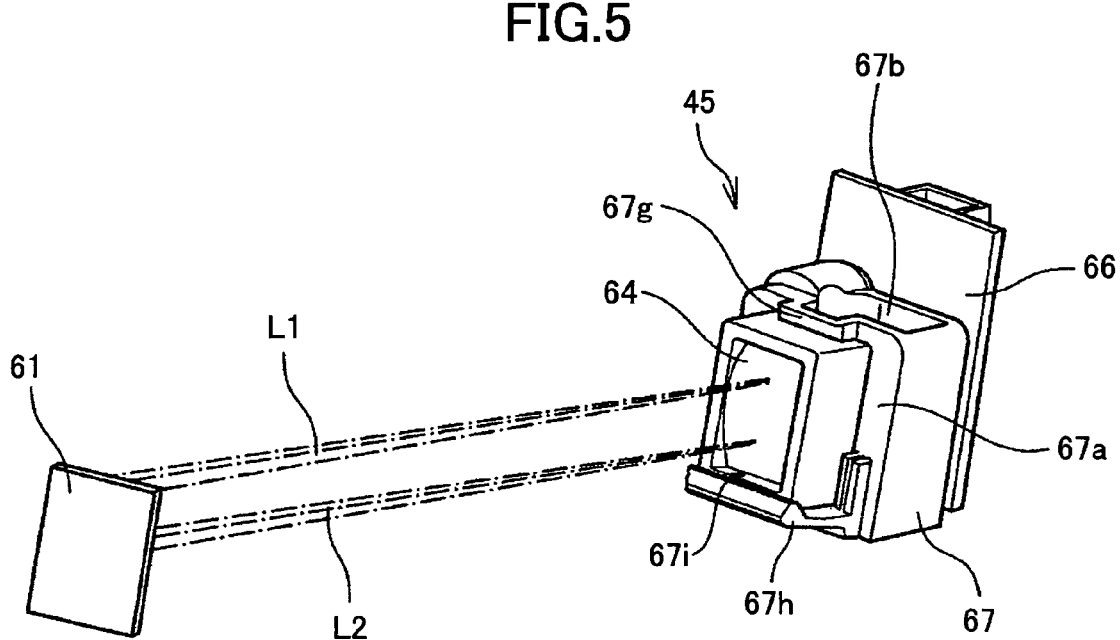
FIG. 5 is a perspective view for describing a synchronization detection part according to an embodiment of the present invention.

Next, the synchronization detection part 45 of the optical writing apparatus 4 according to an embodiment of the present invention is described with reference to FIGS. 4 and 5. FIG. 4 is a schematic side view of the synchronization detection part 45 according to an embodiment of the present invention. FIG. 5 is a schematic perspective view of the synchronization detection part 45 according to an embodiment of the present invention.

Since the original purpose of a synchronization detection part is to detect the timing to start the scanning (deflecting), the synchronization detection part may be disposed at a position before (at the front of) a part at which scanning (scanning and deflecting) is performed. The synchronization detection part 45 according to an embodiment of the present invention is also disposed at a position after (at the rear of) the polygon mirror 42 for detecting the change in the speed of a single scan (or the time of a single scan). FIG. 4 shows an exemplary configuration of the synchronization detection part 45 serving to detect the timing before and after scanning. In this example, a single synchronization detection part 45 detects two scanning light beams (in this example, referred to as laser beams L1 and L2) in which one light beam is positioned above the other.

Figure 3:
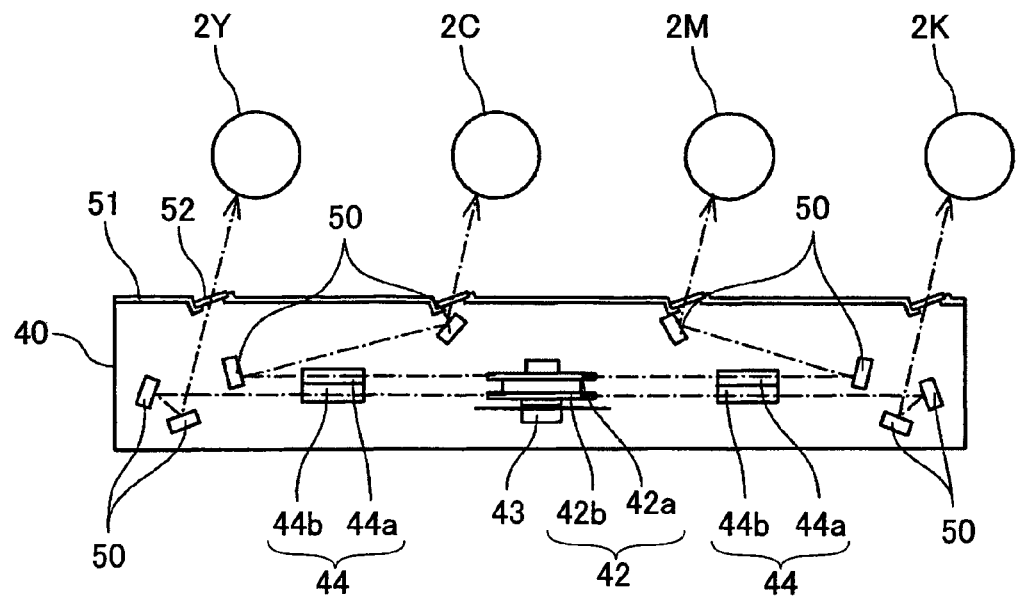
FIG. 3 is a side view showing an optical writing apparatus according to an embodiment of the present invention.

That is, the polygon mirror 42, serving to deflect (deflect and scan) the laser beams L1, L2 has a layer configuration of deflecting (deflecting and scanning) planes, that is, a layer configuration including two polygon mirrors 42a and 42b as shown in FIGS. 3 and 4. The imaging elements (imaging lenses) 44 for imaging the deflected laser beams L1, L2 on the photoconductor drum 50 to a desired size also has a layer configuration including imaging element parts 44a and 44b corresponding to laser beams L1 and L2 as shown in FIGS. 3 and 4.

In the imaging element 44, the imaging element part 44b, which is situated below the imaging element part 44a, is mounted to the housing 40. The imaging element part 44a, which is situated above the imaging element part 44b, is adhered (attached) to the imaging element part 44a. Furthermore, space between the laser beams L1 and L2 are set in correspondence with the space between the imaging element parts 44a and 44b.

Accordingly, the laser beams L1 and L2 are deflected from the two polygon mirrors (deflection planes) 42a, 42b of the deflecting part 42 and transmitted through the imaging element parts 44a and 44b. Then, the laser beams L1 and L2 transmitted through the imaging element parts 44a and 44b are guided (reflected) to the synchronization detection part 45 by a synchronization detection mirror 61 that is situated outside a scanning area for forming an image as shown in FIG. 2.

Figure 6:
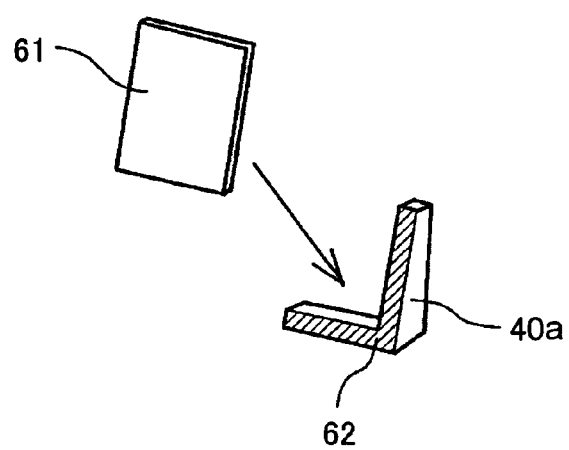
FIG. 6 is a perspective view for describing the mounting of a synchronization detection mirror to a mirror holding part according to an embodiment of the present invention.

The synchronization detection mirror 61 is mounted on a mirror receiving plane 62 of a substantially L-shaped mirror holding part 40a (see FIG. 6) and is attached to the housing 40 with a leaf spring (not shown). Thereby, the synchronization detection mirror 61 is downwardly inclined (e.g. inclined in a sub-scanning direction) in an angle of θ1 with respect to a line "A" that is perpendicular to the horizontal plane of the housing 40 (it is preferable for the angle θ1 to range within approximately 3 degrees) It is to be noted that the synchronization detection mirror 61 may be mounted on the mirror receiving plane 62 by using, for example, an adhesive.

The synchronization detection part 45 (to which the laser beams L1, L2 are guided from the synchronization detection mirror 61) includes a lens 64 for converging the laser beams L1 and L2, a light detection plate 66 including a photoelectric element 65 for detecting the laser beams L1 and L2 converged by the lens 64, and a holding member 67 for holding the lens 64 and the light detection plate 66 as shown in FIGS .4 and 7.

Figure 7:
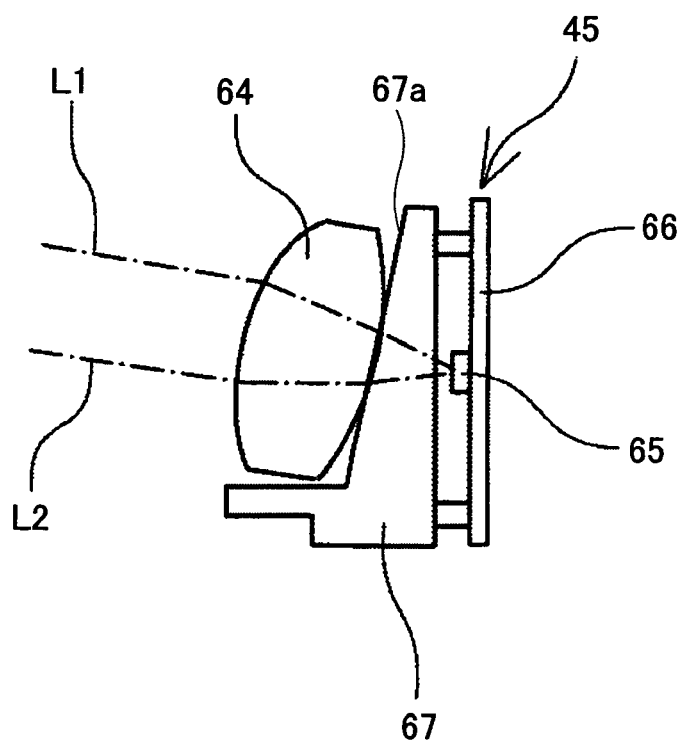
FIG. 7 is a side view for describing a mounting part of a synchronization detection part according to an embodiment of the present invention.

The holding member 67 holds the lens 64 at a lens holding plane 67a thereof (see FIG. 5). Accordingly, as shown in FIG. 7, the lens 64 is held by the holding member in an upwardly inclined state. That is, the lens holding plane 67a of the holding member 67 forms, for example, a substantially perpendicular angle with respect to the laser beams L1, L2 (forming an incident angle of approximately 0 degrees), and holds the lens 64 so that the laser beams L1, L2 (guided from a lower diagonal direction) has an angle in the sub-scanning direction that is, for example, substantially equal to the focus angle of the lens 64. In this example, the angle of the inclination of the lens may be substantially two times the angle of the inclination of the synchronization detection mirror 61.

Furthermore, the holding member 67 holds the light detection plate 66 at its rear side in a manner that the light detection plate 66 is perpendicular to the housing 40. Furthermore, the holding member 67 is also mounted in a manner that the holding member 67 is perpendicular to the housing 40.

The lens 64 is formed with a curvature for allowing the laser beams L1, L2 to be incident to the photoelectric element 65 of the light detection plate 66. The lens 64 converge the laser beams L1 and L2 to substantially the same area and narrows the beam diameter for allowing the beam to be incident on the photoelectric element 65 of the light detection plate 66.

Figure 8:
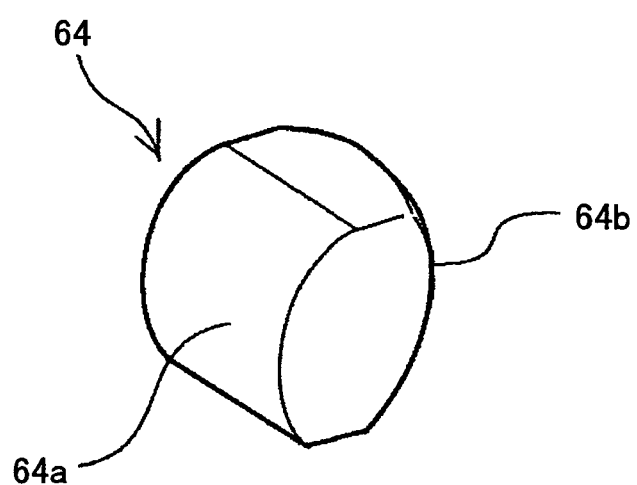
FIG. 8 is a perspective view for describing a lens of a synchronization detection part according to an embodiment of the present invention.

As shown in FIG. 8, the lens 64 may have, for example, a first side (side to which the laser beams L1, L2 are incident) which is a cylindrical surface and a second side (side from which the laser beams L1, L2 are outgoing) which is a spherical surface. Alternatively, the lens 64 may have, for example, a first side (side to which the laser beams L1, L2 are incident) which is a spherical surface and a second side (side from which the laser beams L1, L2 are outgoing) which is a cylindrical surface.

Accordingly, the laser beams L1, which are guided to the synchronization detection mirror 61 in a lower diagonal direction, are converged by the lens 64 of the synchronization detection part 45. The converged beam has its diameter narrowed by the lens 64 and is directed incident to the photoelectric element 65 of the light detection plate 66. Hence, multiple laser beams can be detected at the same synchronization detection part 45.

Thus, by providing a synchronization detection mirror for reflecting multiple light beams from a deflecting part and by providing a synchronization detection part including a lens for converging the multiple light beams reflected from the synchronization detection mirror, a light detection plate for detecting the light beams that is converged by the lens, and a holding member for holding the lens and light detection plate, the multiple light beams can be incident to the same synchronization detection part. Accordingly, synchronization detection can be performed without complicating the configuration of the imaging element (imaging lens).

Furthermore, since the multiple light beams are incident to synchronization detection part in a diagonally downward (down slope) manner, the mounting member (holding member) for mounting (holding) the synchronization detection mirror may be formed having an inclination. This simplifies a drawing (draw molding) operation in a resin molding process. Accordingly, the manufacture process is easier. Furthermore, the lens holding plane of the holding member may also be formed having an inclination. This also simplifies a drawing (draw molding) operation in a resin molding process. Accordingly, the manufacture process is easier.

In the image forming apparatus according to one embodiment of the present invention, the distance between the synchronization detection part 45 and the deflection plane (polygon mirror) 42a of the polygon mirror 42 can be less (e.g. 10% to 16% less) than the distance between the deflection plane (polygon mirror) 42a of the polygon mirror 42 and the photoconductor drum (image carrier) 2. This enables size reduction of the optical writing apparatus 4.

In the example described above, the first side 64a of the lens 64 is formed with a cylindrical surface (r=12 mm) and the second side 64b of the lens 64 is formed with a spherical surface (−16 mm) in order to ensure a sufficient beam diameter and a beam position on the photoelectric element 65 of the light detection plate 66. Furthermore, the material of the lens 64 may be formed of, for example, PMMA. The same advantage (effect) can also be attained in a case where the first side 64a of the lens 64 is formed with a spherical surface and the second side 64b of the lens 64 is formed with a cylindrical surface.

Figure 9:
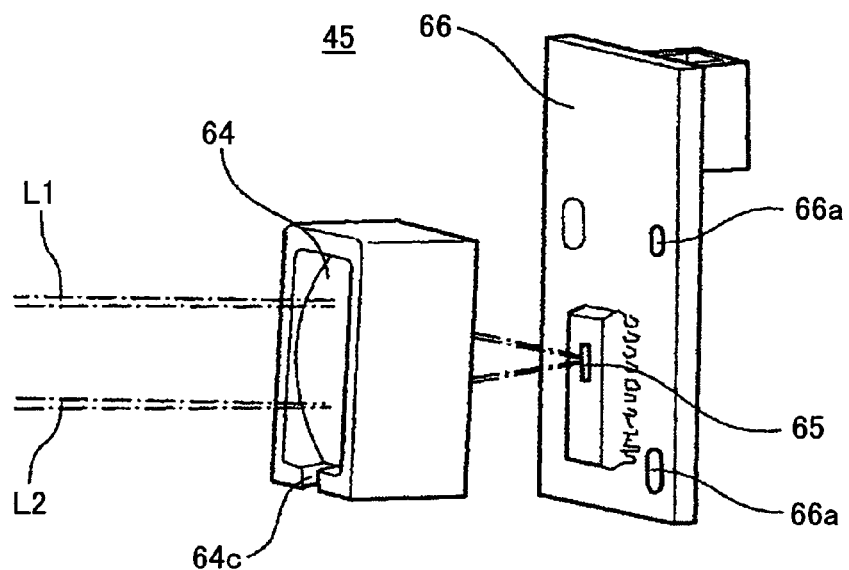
FIG. 9 is a perspective view for describing a synchronization detection part without a holding member according to an embodiment of the present invention.
Figure 10:
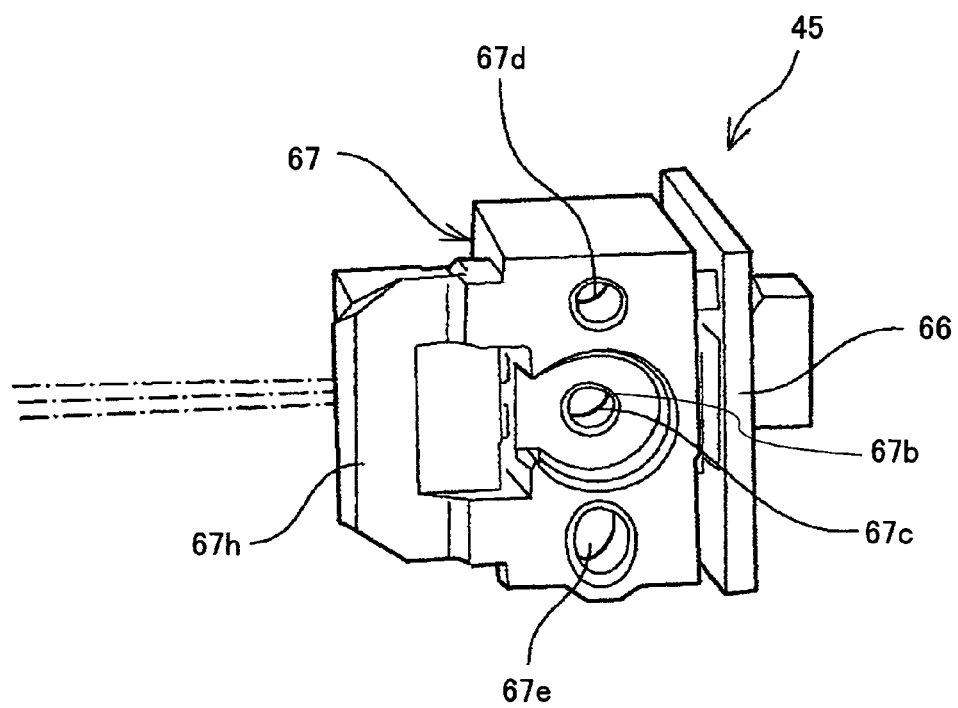
FIG. 10 is a schematic view of a synchronization detection part according to an embodiment of the present invention in a case where the synchronization detection part of FIG. 5 is observed from a bottom side.
Figure 11:
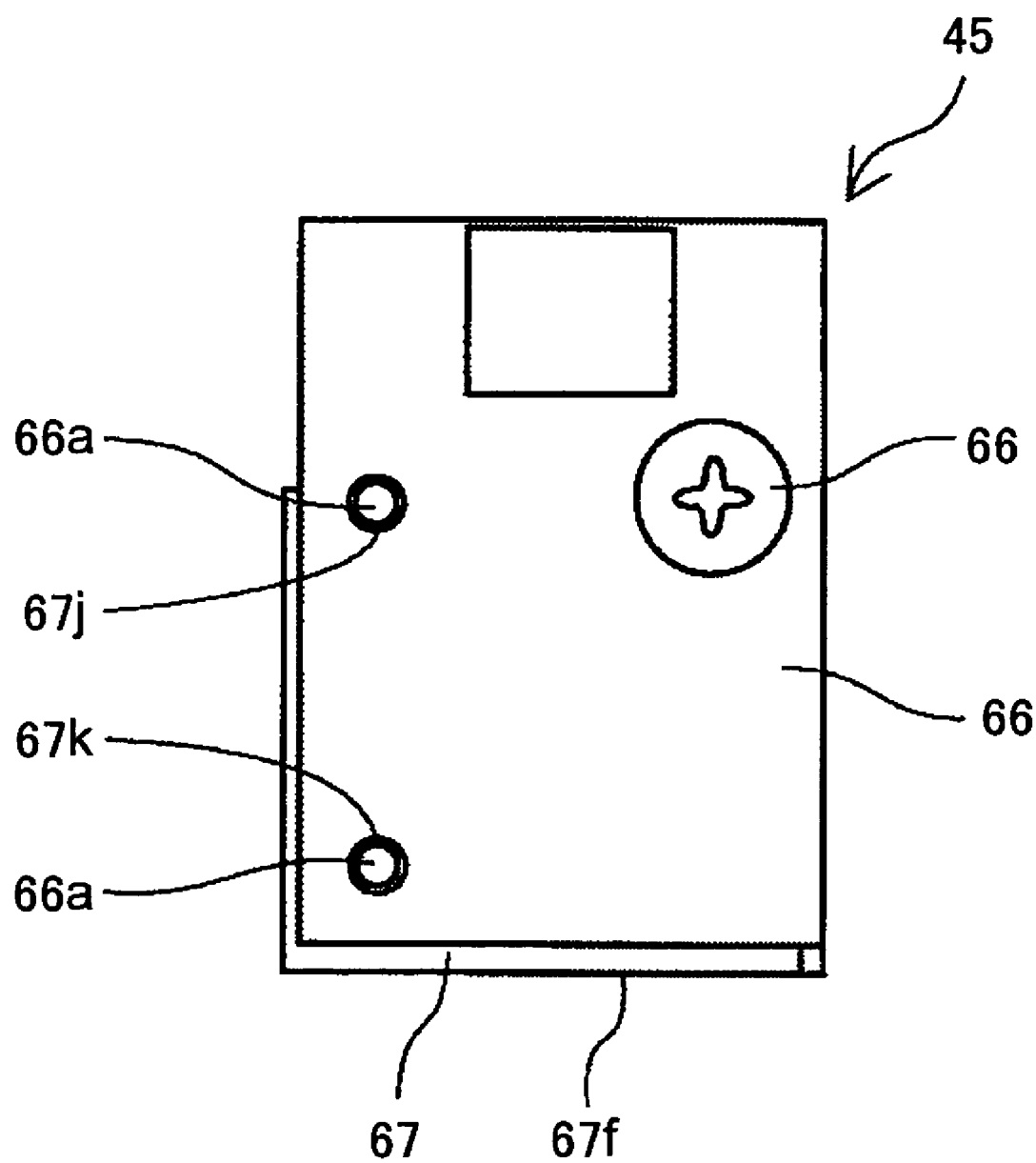
FIG. 11 is a schematic view of a synchronization detection part according to an embodiment of the present invention in a case where the synchronization detection part of FIG. 5 is observed from a right side (rear side).

Next, a mounting configuration of the synchronization detection part 45 is described with reference to FIGS. 9-11. FIG. 9 is a perspective view of the synchronization detection part 45 without the holding member 67. FIG. 10 is a schematic view of the synchronization detection part 45 in a case where the synchronization detection part 45 of FIG. 5 is observed from a bottom side. FIG. 11 is a schematic view of the synchronization detection part 45 in case where the synchronization detection part 45 of FIG. 5 is observed from a right side (rear side).

Since the synchronization detection part 45 is mounted to the housing 40 by fastening with a single screw (not shown) at a center portion of the holding member 67), a space 67b (see FIG. 5) is provided for allowing the screw to be disposed between the lens 64 and the light detection plate 66. As shown in FIG. 10, a tapped hole (screw hole) 67c, which continues to the space 67b, is formed in the holding member 67.

Accordingly, by providing the space 67b for providing a screw between the lens 64 and the light detection plate 66, the holding member 67 of the synchronization detection part 45 can be securely fixed to the housing 40 with use of a single screw. Furthermore, the mounting process is easy since the synchronization detection part 45 can be mounted from a perpendicular direction with respect to the housing 40.

The holding member 67 is provided with locating holes 67d, 67e for setting the position for fastening the screw. The locating holes 67d, 67e are to engage with boss parts (not shown) of the housing 40. The locating holes 67d, 67e are substantially symmetrically disposed having the tapped hole 67c situated therebetween. The locating holes 67d, 67e serve to improve the efficiency of the mounting process of the holding member 67.

In this example, the plane of the holding member 67 for mounting to the housing 40 is provided at a bottom part 67f of the holding member (see FIG. 11). Alternatively, as long as a sufficient space can be obtained for the screw, the plane of the holding member 67 for mounting to the housing 40 may be the plane where the screw is provided.

Furthermore, as shown in FIG. 5, by providing a protruding part 67g at an upper part of the holding member 67 and providing a flexible claw part 67h at a lower part of the holding member 67, the lens 64 can be fixed by an pressing force between protruding part 67g and the claw part 67h. By forming the holding member 67 with a resin material, flexibility can be attained for the claw part 67h. This makes the mounting process easier.

In this example, the positioning (mounting) of the lens 64 in a horizontal direction is realized by engaging a recess part 64c (see FIG. 9) of the lens and a protruding part 67i of the claw part 67h. It is to be noted that the above-described recess part and the protruding part may be formed either in the lens 64 or the holding member 67.

Furthermore, the light detection plate 66 is positioned by providing with boss parts 67j, 67k in two areas in the holding member 67 and engaging locating holes 66a to the boss parts 67j, 67k as shown in FIG. 11. Furthermore, the light detection plate 66 is fixed by fastening with a screw 68.

Further, the present invention is not limited to these embodiments, but various variations and modifications may be made without departing from the scope of the present invention.

The present application is based on Japanese Priority Application No. 2004-269314 filed on Sep. 16, 2004, with the Japanese Patent Office, the entire contents of which are hereby incorporated by reference.

What is claimed is:

1. An optical writing apparatus comprising:
    a deflecting part having a deflection plane for deflecting a plurality of light beams;
    a synchronization detection mirror for reflecting the plural light beams from the deflecting part;
    a synchronization detection part for detecting the timing for deflecting the plural light beams reflected from the synchronization detection mirror, the synchronization detection part including
        a lens for converging the plural light beams reflected from the synchronization detection mirror,
        a light detection plate for detecting the plural light beams converged by the lens,
        a holding member for holding the lens and the light detection plate; and
    a housing for housing the deflecting part and the synchronization detection part;
    wherein the synchronization detection mirror is downwardly inclined at a predetermined angle with respect to a plane perpendicular to a scanning plane of the deflecting part,
    wherein the synchronization detection mirror reflects the plural light beams to the lens at a diagonally downward acute angle with respect to the scanning plane of the deflecting part,
    wherein the holding member has a lens holding plane that is inclined in a sub-scanning direction to hold the lens in an upward inclined state,
    wherein the lens holding plane is inclined substantially perpendicular with respect to the plural light beams incident on the lens,
    wherein the plural light beams are separated with respect to the sub-scanning direction,
    wherein the holding member has a box-like shape,
    wherein one plane of the holding member is the lens holding plane that holds the lens and the other plane of the holding member is a plane that holds the light detection plate,
    wherein the holding member has an opening and a space that are formed at a substantially center portion thereof between the lens and the light detection plate for inserting a fastening member therethrough,
    wherein both sides of the holding member are formed by walls for encasing the space therein, and
    wherein the holding member has a hole at a bottom thereof continuing from the space for fastening the fastening member to the housing.

2. The optical writing apparatus as claimed in claim 1, wherein the lens holding plane holds the lens so that the diagonally downward acute angle formed by the plural light beams with respect to the scanning plane of the deflecting part is substantially equal to an angle formed by an optical axis of the lens with respect to the scanning plane of the deflecting part.

3. The optical writing member as claimed in claim 1, wherein the holding member has a tapped hole provided between the lens and the light detection plate for attachment to the housing.

4. The optical writing member as claimed in claim 3, wherein the holding member has locating holes provided on both sides of the tapped hole.

5. The optical writing apparatus as claimed in claim 1, wherein the holding member is formed of a resin material.

6. An image forming apparatus comprising:
    an image carrier; and
    the optical writing apparatus as claimed in claim 1 for writing an image onto the image carrier.

7. The image forming apparatus as claimed in claim 6, wherein the distance from the deflection plane of the deflecting part to the synchronization detection part is substantially 10% to 16% less than the distance from the deflection plane of the deflecting part to the image carrier.

8. The image forming apparatus as claimed in claim 6, wherein the lens has an incident side being a cylindrical surface and an outgoing side being a spherical surface.

9. The image forming apparatus as claimed in claim 6, wherein the lens has an incident side being a spherical surface and an outgoing side being a cylindrical surface.

* * * * *